US010431131B2

(12) United States Patent
Ano

(10) Patent No.: US 10,431,131 B2
(45) Date of Patent: Oct. 1, 2019

(54) PROJECTOR AND CONTROL METHOD FOR PROJECTOR

(71) Applicant: SEIKO EPSON CORPORATION, Tokyo (JP)

(72) Inventor: Takahiro Ano, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 162 days.

(21) Appl. No.: 15/283,495

(22) Filed: Oct. 3, 2016

(65) Prior Publication Data
US 2017/0103687 A1    Apr. 13, 2017

(30) Foreign Application Priority Data

Oct. 9, 2015 (JP) ................. 2015-201164

(51) Int. Cl.
G09G 3/00 (2006.01)
G06F 3/042 (2006.01)
G06T 3/40 (2006.01)
G09G 5/373 (2006.01)
G09G 5/14 (2006.01)
H04N 9/31 (2006.01)
G06T 7/62 (2017.01)

(52) U.S. Cl.
CPC .......... G09G 3/002 (2013.01); G06F 3/0426 (2013.01); G06T 3/40 (2013.01); G06T 7/62 (2017.01); G09G 5/14 (2013.01); G09G 5/373 (2013.01); H04N 9/31 (2013.01); G09G 2340/04 (2013.01); G09G 2340/0464 (2013.01); G09G 2340/12 (2013.01); G09G 2354/00 (2013.01)

(58) Field of Classification Search
None
See application file for complete search history.

(56) References Cited

U.S. PATENT DOCUMENTS

2004/0061838 A1    4/2004  Mochizuki et al.
2010/0289937 A1*  11/2010  Hada ............... G03B 13/00
                                                      348/333.01
2013/0314439 A1   11/2013  Ota et al.
2015/0235581 A1*   8/2015  Liang ............... G09G 3/002
                                                      345/581

FOREIGN PATENT DOCUMENTS

| JP | 2000-242394 A | 9/2000 |
| JP | 2001-005911 A | 1/2001 |
| JP | 2006-246502 A | 9/2006 |
| JP | 2007-219966 A | 8/2007 |
| JP | 2013-247486 A | 12/2013 |
| JP | 2014-044369 A | 3/2014 |
| JP | 2015-046833 A | 3/2015 |
| JP | 2015-163930 A | 9/2015 |

* cited by examiner

Primary Examiner — Jwalant Amin
(74) Attorney, Agent, or Firm — Oliff PLC

(57) ABSTRACT

A projector includes a projection optical system configured to project an image on a screen, a size detecting section configured to detect a size of a region of the screen on which the image is projected, a size determining section configured to determine, on the basis of the size of the region detected by the size detecting section, a size of an object projected on the screen, and a projection control section configured to cause the projecting optical system to project the image including the object having the size determined by the size determining section.

6 Claims, 9 Drawing Sheets

PROJECTOR AND CONTROL METHOD FOR PROJECTOR

CROSS-REFERENCE

The entire disclosure of Japanese Patent Application No. 2015-201164, filed Oct. 9, 2015 is expressly incorporated by reference herein.

BACKGROUND

1. Technical Field

The present invention relates to a projector and a control method for the projector.

2. Related Art

There has been known input processing, which is originally performed by an input device such as a keyboard, realized by software by causing a display surface to display an image of an object and detecting operation on the displayed image of the object (see, for example, JP-A-2007-219966 (Patent Literature 1) and JP-A-2000-242394 (Patent Literature 2)).

Patent Literature 1 discloses a projection input apparatus that projects an optical virtual keyboard on a plane, detects, with a camera, reflected light of an infrared beam projected on the plane and reflected by a finger of an operator on the virtual keyboard, and determines a key input on the basis of a signal from the camera. Patent Literature 2 discloses a virtual keyboard system that displays a key top image of a virtual keyboard and a position of a fingertip detected by a fingertip sensor and, with a detection signal from the fingertip sensor, detects that a key input is performed.

However, in the case of a projector that projects an image on a projection surface, a size of the image to be projected changes according to the distance between the projector and the projection surface. When the projector includes a zoom function, it is possible to optionally change the size of the image projected on the projection surface. When the size of the image is changed, a size of an image of an object operated by a user is also changed. The size of the image of the object is not always a size suitable for the operation by the user.

SUMMARY

An advantage of some aspects of the invention is to provide a projector and a control method for the projector that can realize satisfactory operability for the image of the object irrespective of the size of the image projected on the projection surface.

A projector according to an aspect of the invention includes: a projecting section configured to project an image on a projection surface; a size detecting section configured to detect a size of a region of the projection surface on which the image is projected by the projecting section; a size determining section configured to determine, on the basis of the size of the region detected by the size detecting section, a size of an object projected on the projection surface; and a projection control section configured to cause the projecting section to project the image including the object having the size determined by the size determining section.

According to the configuration of the aspect, the image of the object having the size corresponding to the size of the region detected by the size detecting section is projected on the projection surface. Therefore, it is possible to realize satisfactory operability for the image of the object irrespective of the size of the image projected on the projection surface.

In the projector according to the aspect, the projector may further include a storing section configured to store information in which the size of the region and the size of the object corresponding to the size of the region are associated, and the size determining section may determine, referring to the information stored in the storing section, the size of the object corresponding to the size of the region detected by the size detecting section.

According to this configuration, it is possible to acquire, referring to the information stored by the storing section, the size of the object corresponding to the size of the region detected by the size detecting section. Therefore, it is possible to easily acquire the size of the object corresponding to the size of the region detected by the size detecting section.

In the projector according to the aspect, when the storing section does not store the size of the object corresponding to the size of the region detected by the size detecting section, the size determining section may calculate the size of the object according to proportional calculation using the information stored by the storing section.

According to this configuration, even if the size of the object corresponding to the size of the region detected by the size detecting section is not stored in the storing section, it is possible to calculate the size of the object corresponding to the detected size of the region. Therefore, it is possible to reduce an information amount stored by the storing section and reduce a storage capacity.

In the projector according to the aspect, the projector may further include: an image input section configured to input image data projected by the projecting section as the image; an object detecting section configured to detect an image of the object from the image data input by the image input section; and a processing section configured to change, when the image of the object is detected by the object detecting section, a size of the image of the object included in the image data to the size determined by the size determining section.

According to this configuration, when the image of the object is included in the input image data, it is possible to change the size of the image of the object included in the image data to the size determined by the size determining section. Therefore, it is possible to project, on the projection surface, an image of the object having the size corresponding to the size of the region detected by the size detection. Therefore, it is possible to realize satisfactory operability for the image of the object irrespective of the size of the image projected on the projection surface.

In the projector according to the aspect, the projector may further include: an operation detecting section configured to detect operation performed by a pointer on the image of the object projected on the projection surface; and a coordinate converting section configured to convert, on the basis of a position and a size of the image of the object in the image data input by the image input section and a position and a size of the image of the object in the image data processed by the processing section, a coordinate of the operation detected by the operation detecting section into a coordinate in the image data input by the image input section.

According to this configuration, the coordinate of the operation detected by the operation detecting section is converted into the coordinate in the image data input by the image input section. Therefore, it is possible to notify the coordinate of the operation on the image data to an apparatus that supplies the image data to the projector.

In the projector according to the aspect, the projector may further include an imaging section configured to capture an image of the projection surface, the projection control section may cause the projecting section to project, on the projection surface, a pattern image having a pattern of a shape set in advance, and the size detecting section may detect the size of the region on the basis of a captured image obtained by imaging, with the imaging section, the pattern image projected on the projection surface.

According to this configuration, the size of the region is detected on the basis of the captured image obtained by imaging the pattern image projected on the projection surface. Therefore, it is possible to detect the size of the region with a simple configuration.

In the projector according to the aspect, the projection control section may cause the projecting section to project an image of a keyboard as an image of the object.

According to this configuration, the image of the keyboard serving as the image of the object is projected on the projection surface. Therefore, it is possible to perform operation on the image of the keyboard projected on the projection surface.

A control method for a projector according to another aspect of the invention includes: projecting an image on a projection surface; detecting a size of a region of the projection surface on which the image is projected; determining, on the basis of the detected size of the region, a size of an object projected on the projection surface; and projecting the image including the object of the determined size on the projection surface.

According to the configuration of the aspect, the image of the object having the size corresponding to the detected size of the region is projected on the projection surface. Therefore, it is possible to realize satisfactory operability for the image of the object irrespective of the size of the image projected on the projection surface.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

An embodiment of the invention is explained below with reference to the drawings.

Figure 1:
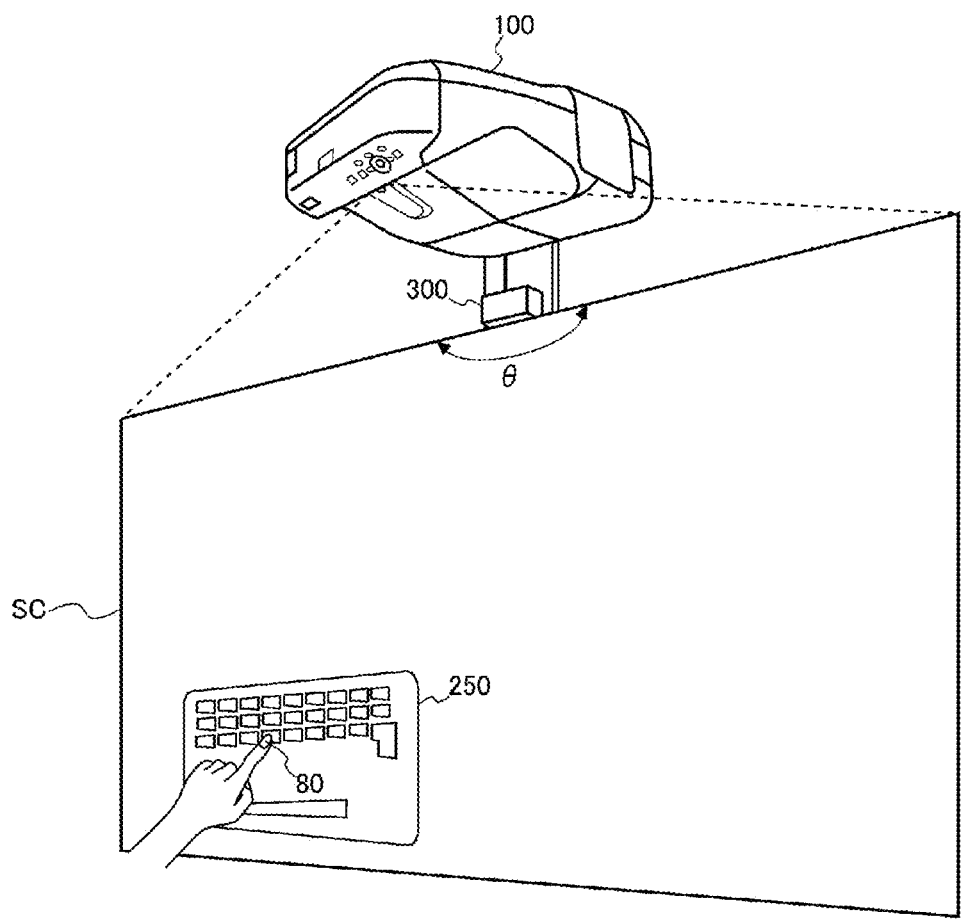
FIG. 1 is a diagram showing a setting state of a projector.

FIG. 1 is a diagram showing a setting state of a projector 100.

The projector 100 is set right above or obliquely above a screen SC (a projection surface) and projects an image onto the screen SC. In the following explanation, an image projected on the screen SC by the projector 100 is referred to as projected image and a region of the screen SC on which the projected image is displayed is referred to as projection region. The screen SC is a flat plate or a curtain fixed to a wall surface or erected on a floor surface. A wall of a meeting room or the like can also be directly used as the screen SC. In this case, the projector 100 is desirably attached to an upper part of the wall used as the screen SC.

The projector 100 detects operation by an operator on the screen SC. The projector 100 detects a pointer 80, which is a finger of the operator, and detects the operation on the screen SC. The operation by the pointer 80 includes operation for causing the pointer 80 to touch any position on the screen SC for a fixed time to designate (point) a position on the screen SC and operation for continuously designating different positions on the screen SC. The operation for designating a position on the screen SC includes, for example, operation for selecting a key of a software keyboard image (hereinafter referred to as screen keyboard image) 250 displayed as an object on the screen SC and operation for selecting a button provided in a toolbar displayed as an object. The operation for continuously designating different positions on the screen SC includes operation for moving the pointer 80 and drawing characters or figures while causing the pointer 80 to touch the screen SC. The screen keyboard image 250 is a virtual keyboard displayed by a CPU mounted on a control section 170A, 170B or 170C explained below executing an application program. The toolbar is a region in which buttons and the like allocated with functions realized by the control section 170A, 170B, or 170C executing an application program are displayed.

In the first to third embodiments, the object is a figure projected on the screen SC and set as an operation target of a user.

Figure 2:
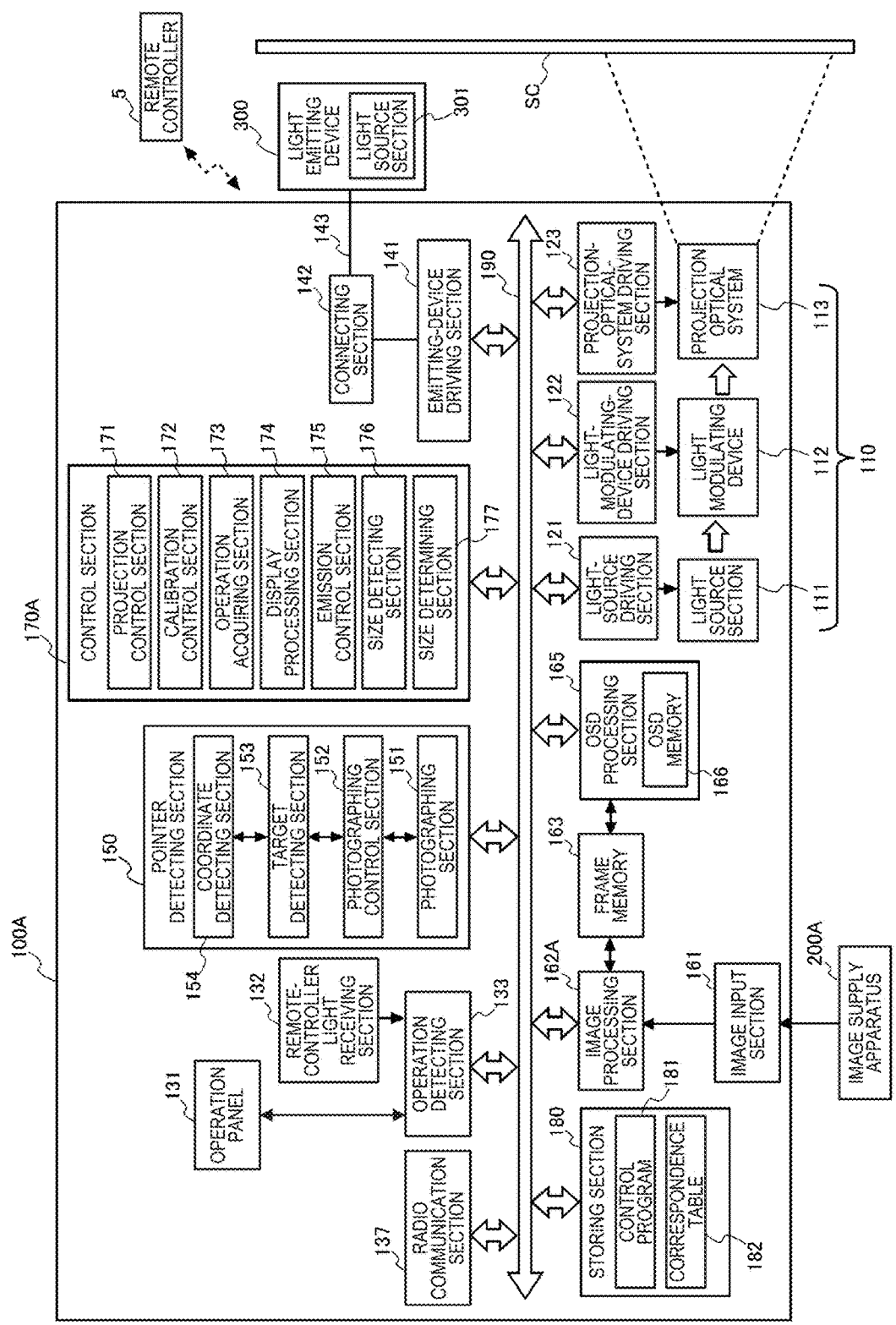
FIG. 2 is a block diagram showing the configuration of a projector in a first embodiment.

FIG. 2 is a block diagram showing the configuration of the projector 100. In the following explanation, the projector 100 in the first embodiment is referred to as projector 100A.

An image supply apparatus 200A is connected to the projector 100A. The image supply apparatus 200A is an apparatus that supplies image data to the projector 100A. The projector 100A projects, on the screen SC, an image based on the image data supplied from the image supply apparatus 200A or image data stored in advance in a storing section 180 explained below. As the image supply apparatus 200A, for example, a video player, a DVD (Digital Versatile Disk) player, a television tuner, a set top box of a CATV (Cable television), a video output apparatus of a video game and the like, or a personal computer is used.

The projector 100A includes an image input section 161 connected to the image supply apparatus 200A via a cable. The image input section 161 includes a connector for connecting the cable and an interface circuit (any of which are not shown in the figure). Image data supplied from the image supply apparatus 200A is input to the image input section 161.

The interface of the image input section 161 may be an interface for data communication or may be an interface for image communication. Examples of the interface for data communication include Ethernet (registered trademark), IEEE1394, and USB. Examples of the interface for image communication include MHL (registered trademark), HDMI (registered trademark), and DisplayPort.

The image input section 161 may include, as the connector, a VGA terminal to which an analog video signal is input and a DVI (Digital Visual Interface) terminal to which digital video data is input. Further, the image input section 161 includes an A/D conversion circuit. When the analog video signal is input via the VGA terminal, the image input section 161 converts, with the A/D conversion circuit, the analog video signal into image data and outputs the image data to an image processing section 162A explained below.

The projector 100A includes a display section 110 that performs formation of an optical image and projects an image on the screen SC.

The display section 110 includes a light source section 111, a light modulating device 112, and a projection optical system 113 functioning as a projecting section.

The light source section 111 includes a light source including a Xenon lamp, an ultra-high pressure mercury lamp, an LED (Light Emitting Diode), or a laser beam source. The light source section 111 may include a reflector and an auxiliary reflector that lead light emitted by the light source to the light modulating device 112. Further, the light source section 111 may include a lens group for improving an optical characteristic of projected light, a sheet polarizer, a dimming element that reduces a light amount of the light emitted by the light source on a route leading to the light modulating device 112, and the like (none of which are shown in the figure).

The light source section 111 is connected to a light-source driving section 121 and driven by the light-source driving section 121. The light-source driving section 121 is connected to an internal bus 190 to which the control section 170A is connected. The light-source driving section 121 lights and extinguishes the light source of the light source section 111 according to control by the control section 170A.

The light modulating device 112 includes, for example, three liquid crystal panels corresponding to three primary colors of RGB. Light emitted by the light source section 111 is separated into color lights of the three colors of RGB and made incident on the liquid crystal panels corresponding to the color lights. The three liquid crystal panels are transmissive liquid crystal panels. The liquid crystal panels modulate transmitted lights and generate image lights. The image lights passing through the liquid crystal panels and modulated are combined by a combination optical system such as a cross dichroic prism and emitted to the projection optical system 113.

The light modulating device 112 is connected to a light-modulating-device driving section 122 and driven by the light-modulating-device driving section 122. The light-modulating-device driving section 122 is connected to the internal bus 190 and operates according to the control by the control section 170A.

The light-modulating-device driving section 122 generates image signals of R, G, and B on the basis of display image data (explained below) input from an OSD processing section 165 explained below. The light-modulating-device driving section 122 drives, respectively on the basis of the generated image signals of R, G, and B, the liquid crystal panels of the light modulating device 112 corresponding to the image signals and draws images on the liquid crystal panels.

The projection optical system 113 includes a projection lens (not shown in the figure) that projects image light modulated by the light modulating device 112 in the direction of the screen SC and forms an image on the screen SC. The projection lens is a zoom lens having a function of adjusting an angle of view, that is, a size of an image to be projected (zoom adjustment). The projection lens also has a function of adjusting a focal position (focus adjustment).

The projection optical system 113 is connected to a projection-optical-system driving section 123 and driven by the projection-optical-system driving section 123. The projection-optical-system driving section 123 is connected to the internal bus 190.

The projection-optical-system driving section 123 includes a stepping motor and a gear (any of which are not shown in the figure). The projection-optical-system driving section 123 adjusts a lens position of the projection lens and performs the zoom adjustment and the focus adjustment according to the control by the control section 170A.

The projector 100A includes an operation panel 131 and an operation detecting section 133. The operation detecting section 133 is connected to the internal bus 190.

The operation panel 131 functions as a user interface and includes a display screen configured by various operation keys and a liquid crystal panel.

When the operation key provided in the operation panel 131 is operated, the operation detecting section 133 outputs a signal corresponding to the operated key to the control section 170A. The operation detecting section 133 causes a display screen of the operation panel 131 to display various screens on the basis of a display signal input from the control section 170A.

The projector 100A includes a remote-controller light receiving section 132 that receives an infrared signal transmitted from a remote controller 5. The remote-controller light receiving section 132 is connected to the operation detecting section 133. Various operation buttons are provided in the remote controller 5. The remote controller 5 transmits an infrared signal corresponding to operation of the operation buttons. The remote-controller light receiving section 132 receives the infrared signal transmitted from the remote controller 5. The operation detecting section 133 decodes the infrared signal received by the remote-controller light receiving section 132, generates a signal indicating operation content in the remote controller 5, and outputs the signal to the control section 170A.

The projector 100A includes a radio communication section 137. The radio communication section 137 is connected to the internal bus 190. The radio communication section 137 includes an antenna, an RF (Radio Frequency) circuit, and the like not shown in the figure. The radio communication section 137 executes radio communication with an external apparatus under the control by the control section 170A. As a radio communication system of the radio communication section 137, a short-range radio communication system such as wireless LAN (Local Area Network), Bluetooth (registered trademark), UWB (Ultra Wide Band), and infrared communication or a radio communication system that makes use of a cellular phone line can be adopted.

The projector 100A includes an emitting-device driving section 141, a connecting section 142, a light emitting device 300, and a pointer detecting section 150 functioning as an operation detecting section. The emitting-device driving section 141, the light emitting device 300, and the pointer detecting section 150 are used for detection of operation on the screen SC. The emitting-device driving section 141 and the pointer detecting section 150 are connected to the internal bus 190.

The emitting-device driving section 141 is connected to the light emitting device 300 via the connecting section 142. The connecting section 142 is, for example, a connector including a plurality of pins. The light emitting device 300 is connected to the connecting section 142 via a cable 143.

The emitting-device driving section 141 generates a pulse signal according to the control by the control section 170A and outputs the generated pulse signal to the light emitting device 300 via the connecting section 142. The emitting-device driving section 141 supplies electric power to the light emitting device 300 via the connecting section 142.

The light emitting device 300 is exposed to the outside of the projector 100A. However, the light emitting device 300 is configured as a part of the projector 100.

In the light emitting device 300, as shown in FIG. 1, a light source section 301 and optical components are housed in a substantially box-shaped case. The light source section 301 includes a solid-state light source (not shown in the figure) that emits an infrared ray.

The light emitting device 300 lights the light source section 301 with the pulse signal and the electric power supplied from the emitting-device driving section 141. The light emitting device 300 is set above the upper end of the screen SC. The light emitting device 300 emits an infrared ray downward in a range of an angle θ (see FIG. 1). The infrared ray forms a layer of light extending along the screen SC. In this embodiment, the angle θ reaches nearly 180 degrees. The layer of the infrared light is formed over substantially the entire screen SC. The surface of the screen SC and the layer of the infrared ray are desirably close to each other. The light emitting device 300 may include an adjusting mechanism for adjusting the distance and the angle between the layer of the infrared ray emitted by the light source section 301 and the screen SC.

In FIG. 2, a configuration is shown in which the light emitting device 300 is exposed to the outside of the projector 100A. However, a configuration may be adopted in which the light emitting device 300 is incorporated in the projector 100A and the light source section 301 is exposed from a housing of the projector 100A.

Timing when the light source section 301 is lit and extinguished is controlled by a pulse signal input from the emitting-device driving section 141. The control section 170A (an emission control section 175 explained below) controls the emitting-device driving section 141 to light the light source section 301 in synchronization with timing when an imaging section 151 explained below performs imaging.

When a tip (e.g., a fingertip) of the pointer 80 touches the screen SC, the tip of the pointer 80 blocks the layer of the infrared ray emitted from the light emitting device 300. At this point, the infrared ray emitted from the light emitting device 300 is reflected on the pointer 80. A part of reflected light travels toward the projector 100A. The projector 100A detects, with the pointer detecting section 150, the reflected light reflected on the pointer 80 and detects operation of the pointer 80 on the screen SC.

The pointer detecting section 150 includes an imaging section 151, an imaging control section 152, a target detecting section 153, and a coordinate detecting section 154. The pointer detecting section 150 detects operation of the pointer 80 on the screen SC.

The imaging section 151 is incorporated in the projector 100A set above the screen SC. The imaging section 151 includes an image pickup optical system, an image pickup element, and an interface circuit and performs imaging in a projecting direction of the projection optical system 113.

The image pickup optical system configures an image pickup lens that forms a subject image on a light receiving surface of the image pickup element. An angle of view of the image pickup optical system is an angle of view for setting, as an imaging range, a range including the screen SC and a peripheral section of the screen SC. The image pickup element converts the subject image formed on the light receiving surface into an electric image signal and outputs the image signal to the interface circuit. As the image pickup element, a CCD (Charge Coupled Device) or a CMOS (Complementary Metal Oxide Semiconductor) that receives lights in an infrared region and a visible light region is used. The interface circuit applies predetermined processing to the image signal input from the image pickup element and converts the image signal into a digital signal. The interface circuit outputs the converted image signal to the imaging control section 152 as imaging image data.

The imaging section 151 may include a filter that blocks a part of light made incident on the image pickup element. For example, when the image pickup element is caused to receive an infrared ray, a filter that transmits mainly light in the infrared region is disposed in front of the image pickup element.

The imaging control section 152 causes the imaging section 151 to execute imaging and form captured image data. When the imaging section 151 performs imaging by visible light, an image projected on the screen SC is captured. When the imaging section 151 performs imaging by an infrared ray, reflected light of the infrared ray reflected on the pointer 80 appears in an image.

The captured image data is input to the target detecting section 153 from the imaging control section 152. The target detecting section 153 detects an image of the reflected light appearing in the input captured image data. The image of the reflected light is an image of the reflected light of the infrared ray emitted from the light emitting device 300 and reflected on the pointer 80.

The coordinate detecting section 154 detects a coordinate of the image of the reflected light detected by the target detecting section 153. The coordinate detected by the coordinate detecting section 154 is a coordinate on the captured image data. The coordinate detecting section 154 may calculate a coordinate of a pointed position on the image data developed in the frame memory 163 by the image processing section 162A and a coordinate of a pointed position on the image data input to the image input section 161 from the image supply apparatus 200A.

The coordinate detecting section 154 outputs the detected coordinate on the captured image data to the control section 170A as coordinate information.

The projector 100A includes an image processing system. The image processing system is configured centering on the control section 170A that collectively controls the entire projector 100A. Besides, the projector 100A includes an image processing section 162A, a frame memory 163, an OSD (On-Screen Display) processing section 165, and the storing section 180. The control section 170A, the image processing section 162A, the OSD processing section 165, and the storing section 180 are connected to the internal bus 190 capable of performing data communication one another.

The image processing section 162A develops, according to the control by the control section 170A, in the frame memory 163, the image data input from the image input section 161. The image data supplied from the image supply apparatus 200A is hereinafter referred to as input image data.

The image processing section 162A performs, on the input image data developed in the frame memory 163, image processing such as resolution conversion (scaling) processing, resize processing, correction of distortion aberration, shape correction processing, digital zoom processing, tone adjustment processing, and brightness adjustment processing. The image processing section 162A executes processing designated by the control section 170A and performs, according to necessity, the processing using parameters input from the control section 170A. Naturally, the image processing section 162A can also execute a plurality of kinds of processing among the kinds of processing in combination.

The OSD processing section 165 includes an OSD memory 166. The OSD memory 166 stores, as object image information, figure data (e.g., data of a figure of a keyboard displayed as the screen keyboard image 250 and data of a figure displayed as a toolbar), fonts, and the like.

The OSD processing section 165 superimposes, according to an instruction of the control section 170A, an object image such as the screen keyboard image 250 or the toolbar on the input image data developed in the frame memory 163. In the following explanation, an example is explained in which the object image is the screen keyboard image 250.

The OSD processing section 165 outputs the input image data on which the screen keyboard image 250 is superimposed to the light-modulating-device driving section 122 as display image data. Note that, when the instruction for superimposition of the object image is not input from the control section 170A, the OSD processing section 165 directly outputs the input image data processed by the image processing section 162A to the light-modulating-device driving section 122 as the display image data.

The control section 170A includes a CPU, a ROM, and a RAM (none of which are shown in the figure) as hardware. The ROM is a nonvolatile storage device such as a flash ROM and stores a control program such as an OS (Operating System) and data. The RAM configures a work area of the CPU. The CPU develops the control program read out from the ROM or the storing section 180 in the RAM and executes the developed control program to control the respective sections of the projector 100A.

The control section 170A includes a projection control section 171, a calibration control section 172, an operation acquiring section 173, a display processing section 174, an emission control section 175, a size detecting section 176, and a size determining section 177 as functional blocks. The functional blocks are realized by the CPU executing the control program stored in the ROM or the storing section 180.

The storing section 180 stores a control program 181 such as an application program executed by the CPU of the control section 170A. The storing section 180 stores various parameters used for the image processing by the image processing section 162A, calibration image data used for calibration explained below, and pattern image data used for size detection of a projection region explained below.

The storing section 180 stores a correspondence table 182. The correspondence table 182 is referred to by the size determining section 177 and used when a size of the screen keyboard image 250 corresponding to the size of the projection region is detected. In the correspondence table 182, information associating the size of the projection region detected by the size detecting section 176 and the size of the screen keyboard image 250 projected on the screen SC is registered.

The projection control section 171 controls the respective sections of the projector 100A to project an image on the screen SC.

For example, the projection control section 171 causes the image processing section 162A to carry out image processing for the input image data. In this case, the projection control section 171 may read out parameters necessary for the image processing by the image processing section 162A from the storing section 180 and pass the parameters to the image processing section 162A. The projection control section 171 controls the light-source driving section 121 to light the light source of the light source section 111 and adjust the luminance of the light source. Further, the projection control section 171 controls the light-modulating-device driving section 122 to draw images based on the display image data on the liquid crystal panels of the light modulating device 112.

The projection control section 171 controls the projection-optical-system driving section 123 to adjust a lens position of the projection lens and to perform the zoom adjustment and the focus adjustment.

The calibration control section 172 executes calibration for specifying a pointed position of the pointer 80 on a projected image projected on the screen SC. The calibration is, for example, processing for associating a position in the input image data developed in the frame memory 163 and a position on the captured image data captured by the imaging section 151.

The calibration control section 172 reads out, from the storing section 180, for example, calibration image data in which marks set in advance are formed at a predetermined interval and projects a calibration image on the screen SC. The calibration control section 172 controls the pointer detecting section 150 to cause the imaging section 151 to execute imaging. The calibration control section 172 acquires, from the imaging control section 152, captured image data captured by the imaging section 151. The calibration control section 172 detects marks from the acquired captured image data and acquires center of gravity positions of the marks as coordinate values of the marks. The calibration control section 172 performs association of the marks detected from the captured image data and the marks of the calibration image developed in the frame memory 163 and generates calibration data in which a position in the input image data developed in the frame memory 163 and a position on the captured image data captured by the imaging section 151 are associated.

The operation acquiring section 173 acquires coordinate information from the pointer detecting section 150. The coordinate information is information indicating an operation position by the pointer 80.

The operation acquiring section 173 converts a coordinate indicated by the coordinate information acquired from the pointer detecting section 150 into a coordinate for the display processing section 174 to perform drawing. That is, the operation acquiring section 173 converts the coordinate on the captured image data into a coordinate in the frame memory 163 using the calibration data. The operation acquiring section 173 outputs the converted coordinate to the display processing section 174.

The display processing section 174 specifies, on the basis of the coordinate input from the operation acquiring section 173, a position pointed by the pointer 80. For example, in a state in which the screen keyboard image 250 is displayed on the screen SC, when operation is detected by the pointer detecting section 150, the display processing section 174 determines whether an operation position detected by the pointer detecting section 150 corresponds to a display position of a key of the screen keyboard image 250. When determining that the detected operation position corresponds to the display position of the key on the screen keyboard image 250, the display processing section 174 instructs the OSD processing section 165 to display a character allocated to the key displayed in the corresponding position.

The display processing section 174 creates a history of coordinates input from the operation acquiring section 173 and detects, on the basis of the created history, operation for continuously designating different positions on the screen SC. The display processing section 174 determines a character, a figure, or a sign pointed by the pointer 80 according to the detected operation. The display processing section 174 instructs the OSD processing section 165 to draw the determined character, figure, or sign.

The emission control section 175 controls the emitting-device driving section 141 to supply electric power to the light emitting device 300 connected to the connecting section 142. The emission control section 175 controls the emitting-device driving section 141 to turn on or off an output of a pulse signal to the light emitting device 300. When the light emitting device 300 is used, the emission control section 175 causes the emitting-device driving section 141 to start power supply to the light emitting device 300 and causes the emitting-device driving section 141 to turn on the output of the pulse signal.

The size detecting section 176 detects a size of a projected image projected on the screen SC by the projector 100A, that is, a size of the projection region. The size detecting section 176 projects a pattern image set in advance on the screen SC and detects the size of the projection region on the basis of a captured image of a pattern image captured by the pointer detecting section 150.

The operation of the size detecting section 176 is specifically explained.

First, the size detecting section 176 acquires pattern image data from the storing section 180. The size detecting section 176 causes the projection control section 171 to control the image processing section 162A, the light-source driving section 121, the light-modulating-device driving section 122, and other mechanisms on the basis of the acquired pattern image data and project an image (a pattern image) based on the pattern image data on the screen SC. The pattern image is, for example, an image including, at four corners of a maximum region in which pixels can be formed, marks having predetermined shapes indicating the four corners.

Subsequently, the size detecting section 176 controls the imaging control section 152 to cause the imaging section 151 to capture an image of the screen SC. Captured image data captured by the imaging section 151 is output from the imaging control section 152 to the size detecting section 176.

The size detecting section 176 analyzes the captured image data input from the imaging control section 152 and detects a size of an image projection region according to a method explained below. First, the size detecting section 176 specifies data of the marks indicating the four corners from the captured image data according to a method such as pattern matching. Subsequently, the size detecting section 176 detects a separation distance between data of the marks at the two corners separated in the up-down direction among the specified data of the marks at the four corners. The detected separation distance between the data of the marks at the two corners and a separation distance between marks at two corners corresponding to the marks in the pattern image data projected on the screen SC are in a proportional relation. The size detecting section 176 detects length in the up-down direction of the projection region from the detected separation distance on the basis of the proportional relation. The size detecting section 176 detects length in the left-right direction of the projection region on the basis of a separation distance between data of the marks at the two corners separated in the left-right direction in the captured image data according to the same method.

The size detecting section 176 may determine a size of a final projection region on the basis of image processing such as trapezoidal correction executed in the projection of the pattern image data and information such as resolution and an aspect ratio of image data actually projected on the screen SC and zoom magnification set in the projection lens of the projection optical system 113.

Other than the methods for the size detection explained above, a pattern image in which a figure having a shape and a size determined in advance is formed may be projected on the screen SC and the size of the projection region may be detected on the basis of the size of the figure appearing in the captured image data of the imaging section 151.

The size determining section 177 determines, on the basis of the size of the projection region detected by the size detecting section 176, a size of the screen keyboard image 250 projected on the screen SC. The size determining section 177 determines the size of the screen keyboard image 250 projected on the screen SC referring to the correspondence table 182 of the storing section 180. In the correspondence table 182 in this embodiment, sizes of projection regions (e.g., inches indicating lengths of diagonal lines of the projection regions) and sizes of the screen keyboard image 250 corresponding to the sizes of the projection regions are registered in association with each other.

Information registered in the correspondence table 182 as information for specifying the sizes of the projection regions may be inches indicating lengths of diagonal lines of the projection regions and aspect ratios of the projection regions. As the information for specifying the sizes of the projection regions, resolutions in the longitudinal direction and the lateral direction of the input image data may be registered in the correspondence table 182. As the information for specifying the sizes of the projection regions, the zoom magnification of the projection lens may be added to any one of the kinds of information explained above.

Figure 3:
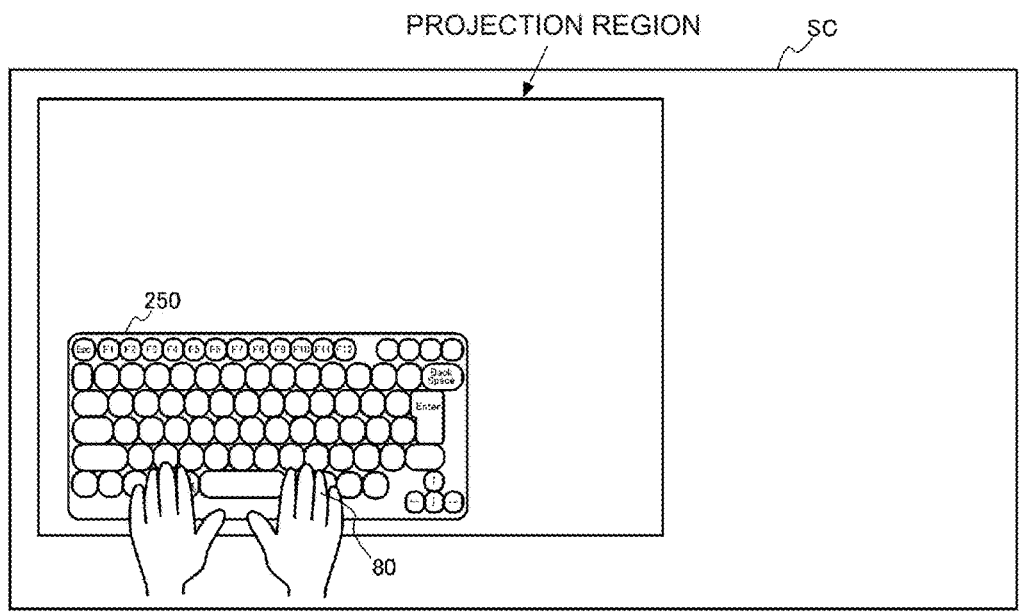
FIG. 3 is a diagram showing a screen keyboard image projected on a screen.
Figure 4:
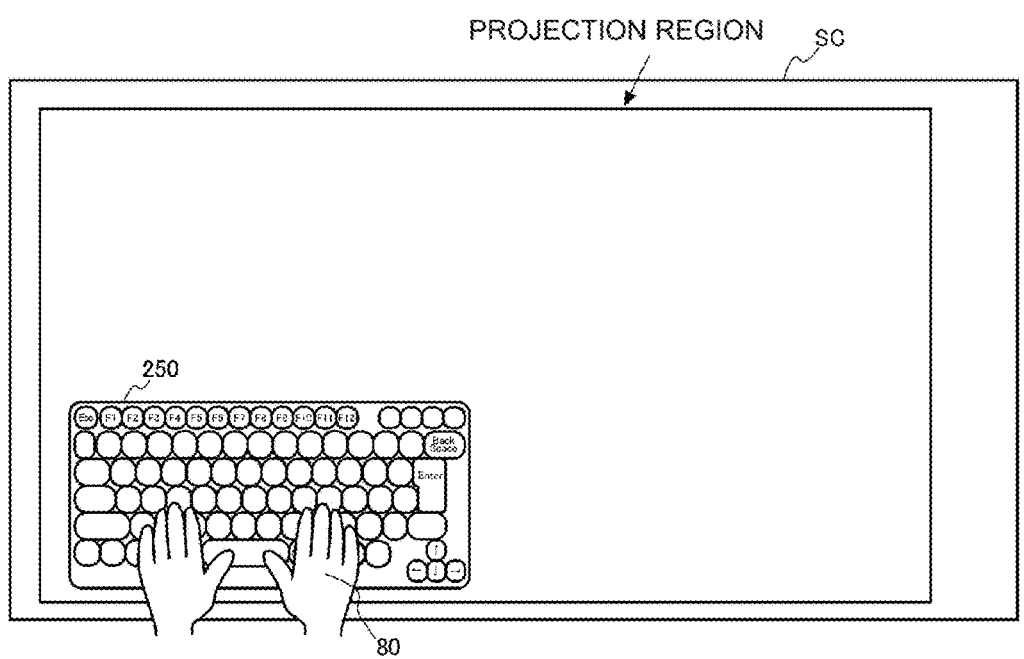
FIG. 4 is a diagram showing the screen keyboard image projected on the screen.

FIGS. 3 and 4 are diagrams showing the screen keyboard image 250 projected on the screen SC.

Information indicating a size of the screen keyboard image 250 corresponding to a size of a projection region registered in the correspondence table 182 may be set such that the size of the screen keyboard image 250 projected on the screen SC is the same size even if the size of the projection region is changed. A size of a projection region shown in FIG. 3 is smaller than a size of a projection region shown in FIG. 4. However, the size of the screen keyboard image 250 is the same in FIGS. 3 and 4.

The size of the screen keyboard image 250 is increased in proportion to the size of the projection region until the size of the projection region reaches a fixed size set in advance. When the size of the projection region exceeds the fixed size, the screen keyboard image 250 having a fixed size may be projected on the screen SC.

Further, even if the size of the projection region (the length of the diagonal line of the projection region) is the same, the size of the screen keyboard image 250 projected on the screen SC may be changed on the basis of an aspect ratio of the projection region.

Input image data may be analyzed and the size of the screen keyboard image 250 may be changed according to a size of a white region where a character or a figure is not disposed. That is, the screen keyboard image 250 may be prevented from being disposed on the character or the figure drawn in the input image data.

When the size of the projection region detected by the size detecting section 176 is a size not registered in the correspondence table 182, the size determining section 177 can also detect, according to proportional calculation, a size of the screen keyboard image 250 corresponding to the size of the projection region.

Figure 5:
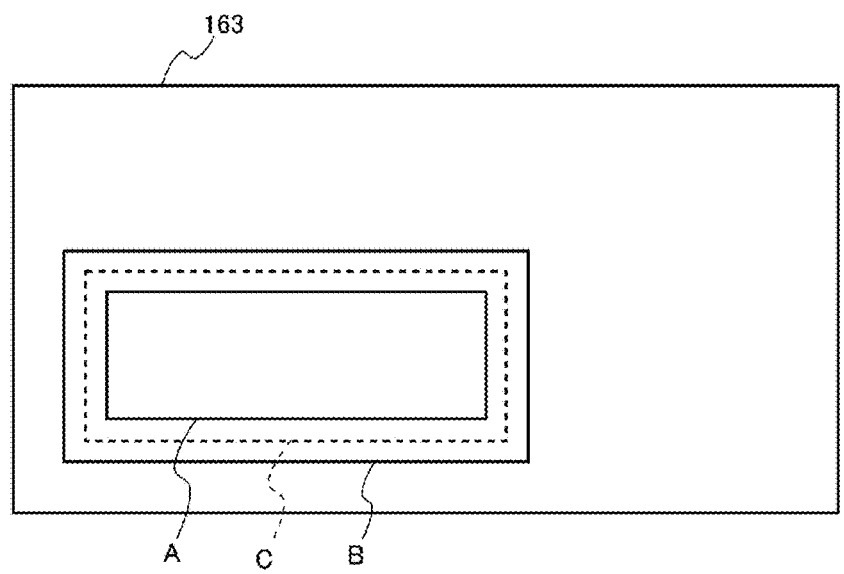
FIG. 5 is a diagram showing a screen keyboard image developed in a frame memory.

FIG. 5 shows the screen keyboard image 250 developed in the frame memory 163.

When the zoom magnification of the projection lens is changed and the size of the projection region is increased, in order to prevent the size of the screen keyboard image 250 projected on the screen SC from being increased, it is necessary to reduce the size of the screen keyboard image 250 superimposed on the input image data of the frame memory 163.

For example, when the size of the projection region is 100 inches, a region of the screen keyboard image 250 superimposed on the input image data of the frame memory 163 is indicated by a rectangular region A indicated by a solid line in FIG. 5. When the size of the projection region is 80 inches, a region of the screen keyboard image 250 superimposed on the input image data of the frame memory 163 is indicated by a rectangular region B indicated by a solid line in FIG. 5. It is assumed that sizes of the screen keyboard image 250 at the time when the size of the projection region is 80 inches and at the time when the size of the projection region is 100 inches are registered in the correspondence stable 182.

Further, it is assumed that the size of the projection region detected by the size detecting section 176 is 90 inches and a size of the screen keyboard image 250 corresponding to 90 inches is not registered in the correspondence table 182. In this case, according to proportional (inversely proportional) calculation of a size of the screen keyboard image 250 at the time when the size of the projection region is 100 inches and a size of the screen keyboard image 250 at the time when the size of the projection region is 80 inches, the size determining section 177 calculates a size of the screen keyboard image 250 at the time when the size of the projection region is 90 inches.

In FIG. 5, a rectangular region C indicated by a broken line indicates a size of the screen keyboard image 250 at the time when the size of the projection region calculated by the size determining section 177 is 90 inches.

The size determining section 177 notifies the OSD processing section 165 of the determined size of the screen keyboard image 250. The OSD processing section 165 superimposes, on a set region, the screen keyboard image 250 having the size notified from the size determining section 177. The region set in advance can be set and changed by operation of the operation panel 131 or the remote controller 5.

The OSD processing section 165 outputs the input image data on which the screen keyboard image 250 is superimposed to the light-modulating-device driving section 122 as display image data.

Figure 6:
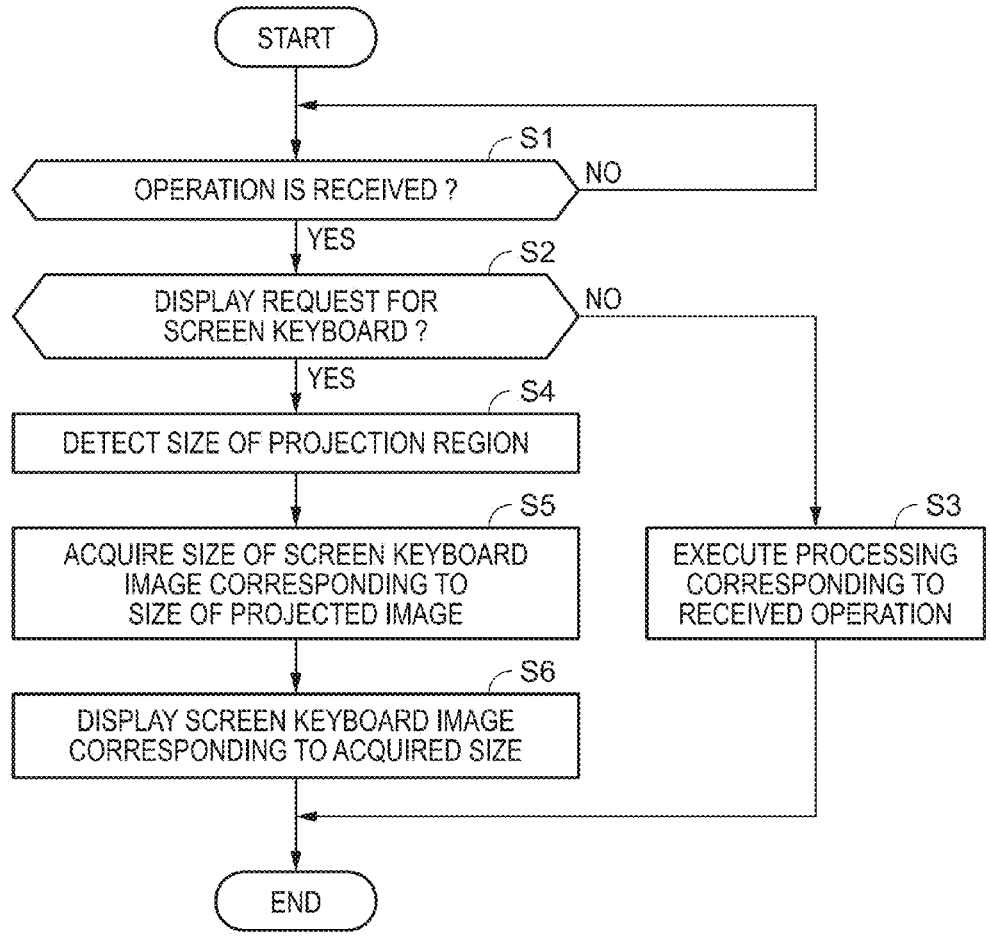
FIG. 6 is a flowchart for explaining the operation of the projector in the first embodiment.

FIG. 6 is a flowchart for explaining the operation of the control section 170A. In this flow, an example is explained in which the screen keyboard image 250 is displayed as an image of an object. However, the image of the object is not limited to the screen keyboard image 250 and may be, for example, a menu bar, a toolbar, or an icon or may be a simple figure such as a circle, a triangle, or a square for receiving operation by the pointer 80.

First, the control section 170A determines whether operation of the operation panel 131 or the remote controller 5 is received (step S1). When the operation of the operation panel 131 or the remote controller 5 is not received (NO in step S1), after the elapse of time set in advance, the control section 170A determines again whether the operation is received (step S1). When the operation of the operation panel 131 and the remote controller 5 is received (YES in step S1), the control section 170A starts the operation shown in the flowchart of FIG. 6.

The control section 170A determines whether the received operation of the operation panel 131 or the remote controller 5 is operation for requesting display of the screen keyboard image 250 (step S2). When the received operation is not the operation for requesting the display of the screen keyboard image 250 (NO in step S2), the control section 170A executes processing corresponding to the received operation (step S3). For example, when the received operation is operation for selecting a button of a toolbar displayed on the screen SC, the control section 170A executes a function allocated to the selected button. In the toolbar, for example, buttons of "data saving", "undo", and the like are provided. The "data saving" is a function for saving an image displayed on the screen SC and drawing data drawn on the image. The "undo" is a function for undoing received immediately preceding operation.

When the received operation is operation for requesting display of the screen keyboard image 250 (YES in step S2), the control section 170A detects, with the size detecting section 176, a size of a projection region (step S4). As explained above, the size detecting section 176 projects a pattern image on the screen SC and detects the size of the projection region on the basis of captured image data obtained by imaging the pattern image. The size detecting section 176 outputs the detected size of the projection region to the size determining section 177.

When the size of the projection region is input from the size detecting section 176, the size determining section 177 acquires, referring to the correspondence table 182 of the storing section 180, a size of the screen keyboard image 250 corresponding to the input size of the projection region (step S5). The acquired size of the screen keyboard image 250 is a size of an image superimposed on the input image data of the frame memory 163.

The size determining section 177 notifies the OSD processing section 165 of the acquired size of the screen keyboard image 250. The OSD processing section 165 reads out the screen keyboard image 250 from the OSD memory 166 and adjusts a size of the read-out screen keyboard image 250 to be the size notified from the size determining section 177. The OSD processing section 165 superimposes the screen keyboard image 250, the size of which is adjusted, in a position set in advance of the input image data developed in the frame memory 163. The position where the screen keyboard image 250 is superimposed may be a position set in advance by the user.

The OSD processing section 165 outputs the input image data, on which the screen keyboard image 250 is superimposed, to the light-modulating-device driving section 122 as display image data.

Thereafter, the projection control section 171 of the control section 170A controls the light-source driving section 121, the light-modulating-device driving section 122, and the other mechanisms to project an image on the screen SC (step S6).

As explained above, the projector 100A and the control method for the projector 100A in the first embodiment include the size detecting section 176 that detects a size of a projection region of the screen SC and the size determining section 177 that determines, on the basis of the detected size of the projection region, a size of the screen keyboard image 250 projected on the screen SC. The projection control section 171 projects, on the screen SC, an image including the screen keyboard image 250 having the size determined by the size determining section 177. Therefore, with the projector 100A and the control method for the projector 100A in the first embodiment, it is possible to project, on the screen SC, the screen keyboard image 250 having the size corresponding to the size of the projection region detected by the size detecting section 176. Therefore, it is possible to suppress deterioration in operability of operation on an image of an object irrespective of a size of an image projected on the screen SC.

The projector 100A and the control method for the projector 100A in the first embodiment include the storing section 180 that stores the correspondence table 182 in which the size of the projection region and the size of the screen keyboard image 250 corresponding to the size of the projection regions are associated. The size determining section 177 determines, referring to the correspondence table 182 of the storing section 180, a size of the screen keyboard image 250 corresponding to a size of a projection region detected by the size detecting section 176. Therefore, it is possible to easily acquire the size of the screen keyboard image 250 corresponding to the size of the projection region detected by the size detecting section 176.

When the size of the screen keyboard image 250 corresponding to the size of the projection region detected by the size detecting section 176 is not registered in the correspondence stable 182, the size determining section 177 calculates a size of the screen keyboard image 250 according to proportional calculation using the registered information of the correspondence table 182. Therefore, it is possible to reduce an information amount stored by the storing section 180 and reduce a storage capacity.

The projector 100A and the control method for the projector 100A in the first embodiment include the imaging section 151 that captures an image of the screen SC. The size detecting section 176 detects a size of a projection region on the basis of captured image data obtained by imaging, with the imaging section 151, a pattern image projected on the screen SC. Therefore, it is possible to detect the size of the projection region with a simple configuration.

Second Embodiment

A second embodiment of the invention is explained.

Figure 7:
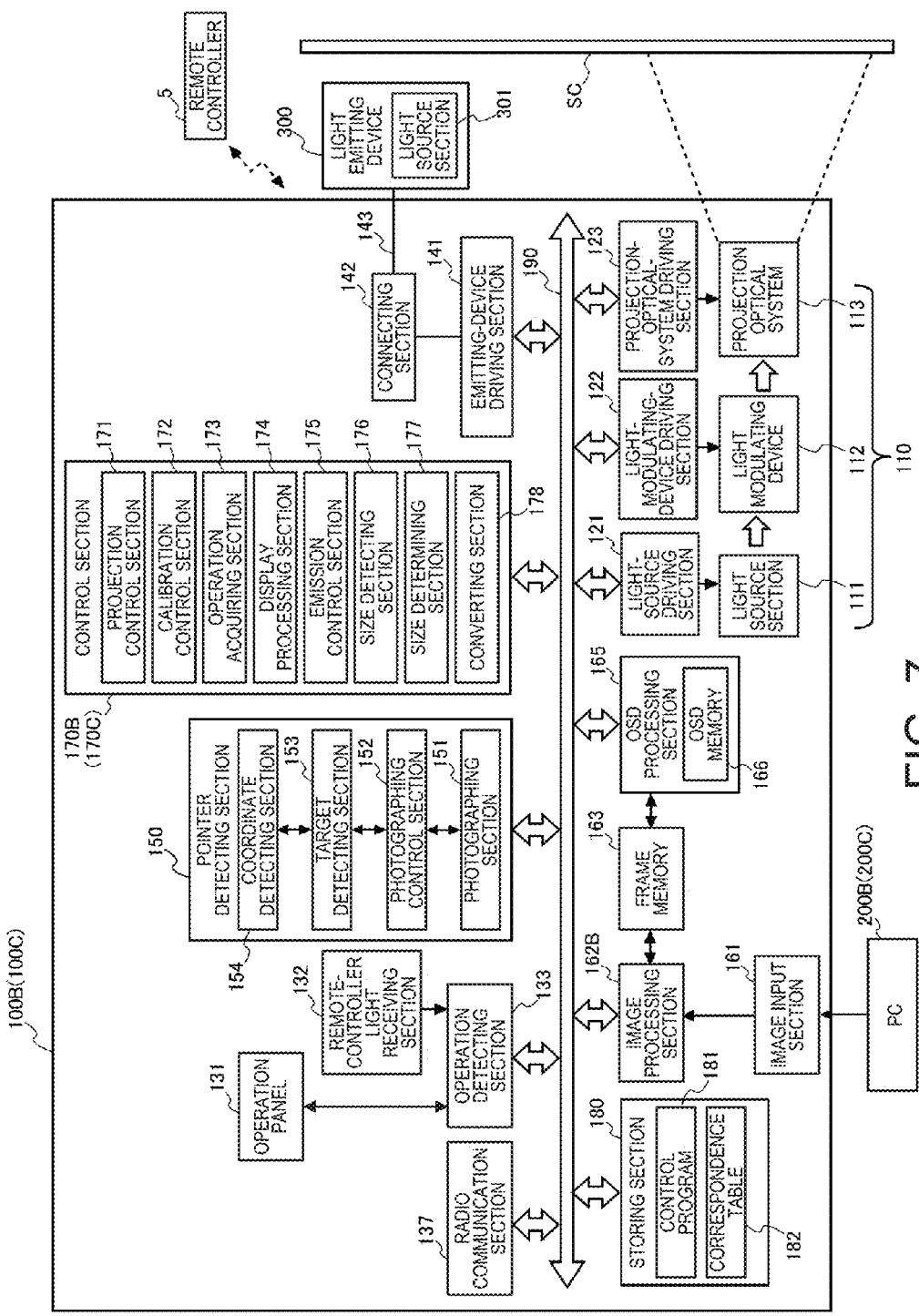
FIG. 7 is a block diagram showing the configuration of a projector in a second embodiment.

FIG. 7 is a configuration diagram showing the configuration of the projector 100 in the second embodiment (the projector 100 in the second embodiment is referred to as projector 100B).

The projector 100B in this embodiment further includes a converting section 178 in the control section 170B.

The converting section 178 functioning as a coordinate converting section converts an operation position of operation by the pointer 80 detected by the pointer detecting section 150 into coordinate information indicating a coordinate in a frame of image data. Details of processing of the converting section 178 are explained below.

An image processing section 162B in this embodiment functions as an object detecting section and develops, in the frame memory 163, input image data input from the image input section 161 and analyzes the input image data.

The image processing section 162B executes detection processing for detecting an image of a screen keyboard (in the following explanation, the image of the screen keyboard included in the input image data is referred to as first screen keyboard image 260) from developed input image data. When the first screen keyboard image 260 is detected from the input image data, the image processing section 162B notifies the control section 170B that the first screen keyboard image 260 is included in the input image data.

When the first screen keyboard image 260 is detected from the input image data, the control section 170B detects a size of a projection region. The control section 170B determines a size of a screen keyboard image corresponding to the detected size of the projection region and notifies the image processing section 162B of the size of the screen keyboard image. The image processing section 162B functioning as a processing section enlarges or reduces the first screen keyboard image 260 included in the input image data to the size of the screen keyboard image notified from the control section 170B. In the following explanation, the enlarged or reduced screen keyboard image is referred to as second screen keyboard image 270. The control section 170B superimposes the second screen keyboard image 270 on the input image data and projects the second screen keyboard image 270 on the screen SC.

In the second embodiment, a personal computer (hereinafter referred to as PC) 200B is used as the image supply apparatus 200A.

The projector 100B in this embodiment operates in a PC interactive mode. The PC interactive mode is a mode for outputting coordinate information indicating an operation position of the pointer 80 detected by the pointer detecting section 150 to the PC 200B and causing the PC 200B to execute processing based on a coordinate of the operation position.

In the PC interactive mode, the projector 100B transmits the coordinate information of the operation of the pointer 80 detected by the pointer detecting section 150 to the PC 200B.

The PC 200B generates, as a part of a function of an OS or according to an application program having a drawing function for drawing an image, drawing data of characters and figures on the basis of coordinate information input from the projector 100B and draws an image in image data being displayed on the screen SC. The PC 200B transmits the image data on which the drawing data is superimposed to the projector 100B.

Figure 8:
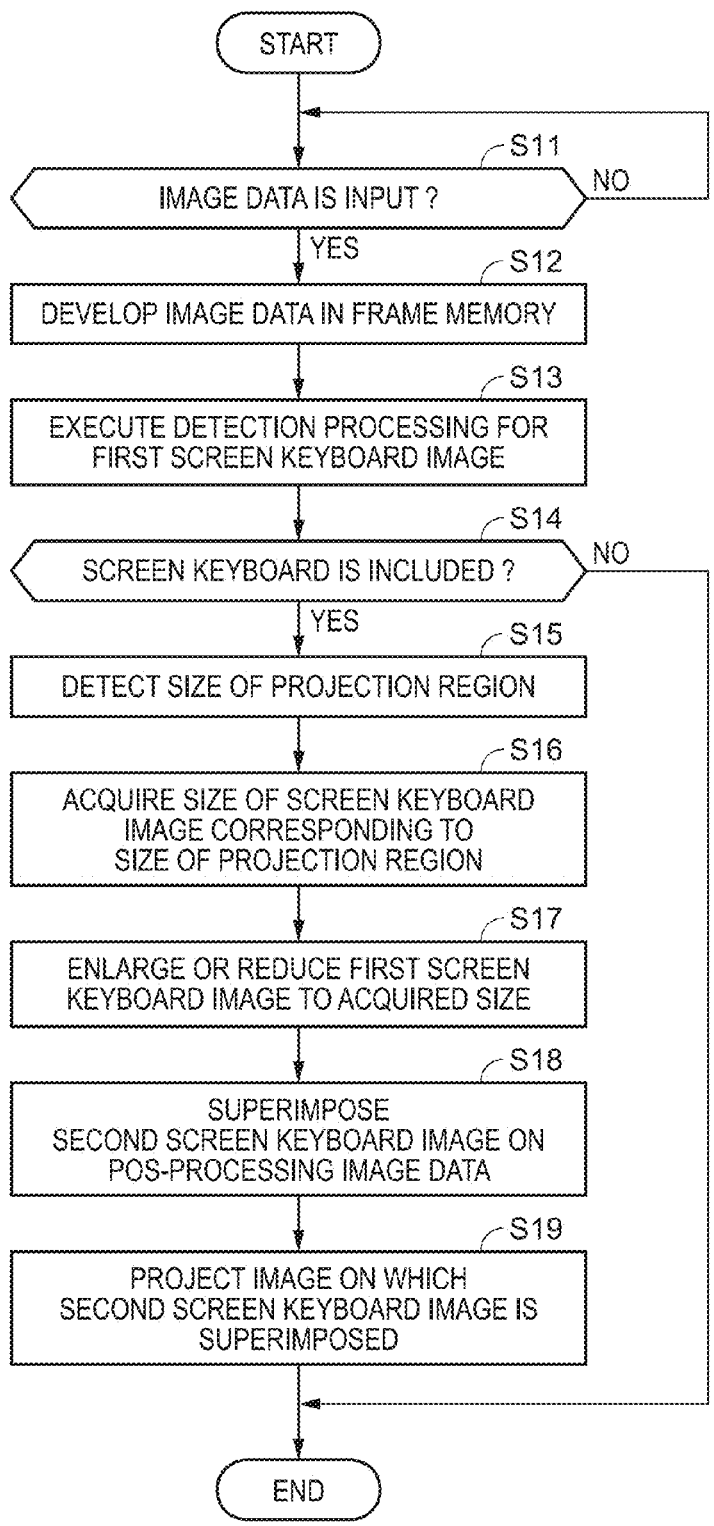
FIG. 8 is a flowchart for explaining the operation of the projector in the second embodiment.

FIG. 8 is a flowchart for explaining the operation of the projector 100B.

The control section 170B determines on the basis of a notification signal input from the image input section 161 whether input image data is input (step S11). When effective input image data is input to the connector included in the image input section 161, the image input section 161 outputs, to the control section 170B, a notification signal for notifying that the input image data is input. When the notification signal is not input (NO in step S11), the control section 170B stays on standby until the notification signal is input.

When the input image data is input according to, for example, operation for a reproduction start on the PC 200B side, the image input section 161 outputs the notification signal to the control section 170B and outputs the input image data to the image processing section 162B. The control section 170B determines that the input image data is input according to the input of the notification signal (YES in step S11). The control section 170B designates processing that the control section 170B causes the image processing section 162B to execute on the input image data.

The image processing section 162B develops the input image data in the frame memory 163 (step S12), analyzes the developed input image data, and executes detection processing for detecting the first screen keyboard image 260 from the input image data (step S13). The image processing section 162B detects a key arrangement of a keyboard and alphanumeric characters displayed on keys from the input image data developed in the frame memory 163 and detects the first screen keyboard image 260. When the first screen keyboard image 260 cannot be detected, the image processing section 162B outputs, to the control section 170B, a signal indicating that the first screen keyboard image 260 is not included in the input image data. When the first screen keyboard image 260 is detected, the image processing section 162B outputs, to the control section 170B, a signal indicating that the first screen keyboard image 260 is included in the input image data.

The image processing section 162B generates correspondence information (hereinafter referred to as first correspondence information) for associating a coordinate in a frame of the input image data and a coordinate in the developed frame memory 163. The first correspondence information may be generated concerning all coordinates of the input image data, coordinate values of which are represented by integers, or may be generated concerning a coordinate of a representative point. The image processing section 162B outputs the generated first correspondence information to the control section 170B (the converting section 178).

The image processing section 162B performs, on the input image data developed in the frame memory 163, image processing designated by the projection control section 171 such as resolution conversion (scaling) processing, resize processing, correction of distortion aberration, shape correction processing, digital zoom processing, tone adjustment processing, and brightness adjustment processing. The input image data subjected to the image processing by the image processing section 162B is referred to as post-processing image data.

After performing the image processing such as shape correction and resolution conversion on the input image data developed in the frame memory 163, the image processing section 162B generates correspondence information (hereinafter referred to as second correspondence information) for associating a coordinate in the post-processing image data and a coordinate in the input image data before the image processing. The second correspondence information may also be generated concerning all coordinates of the post-processing image data, coordinate values of which are represented by integers, or may be generated concerning a coordinate of a representative point. The image processing section 162B outputs the generated second correspondence information to the control section 170B (the converting section 178).

When the first screen keyboard image 260 is detected from the input image data, the image processing section 162B generates position information indicating a position where the first screen keyboard image 260 is disposed in the post-processing image data. The position information is information specified by a coordinate in the frame memory 163 and is, for example, a coordinate indicating an upper left position of the first screen keyboard image 260.

Further, when the first screen keyboard image 260 is detected from the input image data, the image processing section 162B detects a size of the first screen keyboard image 260 (e.g., sizes in the longitudinal direction and the lateral direction of the first screen keyboard image 260) in the post-processing image data.

The control section 170B determines according to a signal input from the image processing section 162B whether the first screen keyboard image 260 is included in the input image data (step S14). When the control section 170B determines that the first screen keyboard image 260 is not included in the input image data (NO in step S14), the projection control section 171 of the control section 170B ends this control flow and executes another control flow and controls the light-source driving section 121 and the projection-optical-system driving section 123 to project an image based on the input image data on the screen SC. When determining that the first screen keyboard image 260 is included in the input image data (YES in step S14), the control section 170B causes the size detecting section 176 to detect a size of a projection region (step S15). A size detecting method for the projection region by the size detecting section 176 is the same as the size detecting method in the first embodiment. Therefore, explanation of the size detecting method is omitted. The size detecting section 176 outputs information indicating the detected size of the projection region to the size determining section 177.

The size determining section 177 acquires, referring to the storing section 180 on the basis of the size of the projection region input from the size detecting section 176, a size of a screen keyboard image corresponding to the detected size of the projection region (step S16). The size determining section 177 outputs size information indicating the acquired size of the screen keyboard image to the image processing section 162B.

The image processing section 162B duplicates the first screen keyboard image 260 from the input image data developed in the frame memory 163 and enlarges or reduces the duplicated first screen keyboard image 260 to the size indicated by the size information input from the size determining section 177 (step S17).

The image processing section 162B superimposes the second screen keyboard image 270 on the post-processing image data developed in the frame memory 163 (step S18). In this case, the image processing section 162B may erase the first screen keyboard image 260 originally included in the post-processing image data or may superimpose the second screen keyboard image 270 on the first screen keyboard image 260 without erasing the first screen keyboard image 260.

A position on the post-processing image data where the second screen keyboard image 270 is superimposed only has to be a position where interactive operation is possible. The position where the interactive operation is possible is a position where the imaging section 151 of the pointer detecting section 150 can capture an image of the pointer 80 and is a position where the pointer detecting section 150 can specify an operation position by the pointer 80 from the captured image data.

In this embodiment, it is assumed that, unless the projector 100B projects the image based on the input image data to the outside of the screen SC, all regions on the input image data are regions where the interactive operation is possible.

After disposing the second screen keyboard image 270 on the post-processing image data, the image processing section 162B generates position information indicating a position on the processed image data where the second screen keyboard image 270 is disposed. The position information is information specified by a coordinate in the frame memory 163 and is, for example, a coordinate indicating an upper left position of the second screen keyboard image 270. The image processing section 162B outputs the generated position information to the control section 170B.

The image processing section 162B reads out, from the frame memory 163, the post-processing image data on which the second screen keyboard image 270 is superimposed and outputs the post-processing image data to the light-modulating-device driving section 122 as display image data.

Thereafter, the light-modulating-device driving section 122 drives the liquid crystal panels of the light modulating device 112 on the basis of image signals of R, G, and B based on the display image data. The projection control section 171 controls the light-source driving section 121 and the projection-optical-system driving section 123 to project an image on the screen SC. Consequently, on the screen SC, an image on which the second screen keyboard image 270 having a size corresponding to the size of the projection region is superimposed is projected (step S19).

In a state in which the second screen keyboard image 270 is displayed on the screen SC, when the user performs, with the pointer 80, operation for the second screen keyboard image 270, the operation is detected by the pointer detecting section 150. The pointer detecting section 150 detects a coordinate indicating an operation position by the pointer 80 from the captured image data captured by the imaging section 151. The pointer detecting section 150 outputs the detected coordinate in the captured image data to the control section 170B. The coordinate in the captured image data is converted into a coordinate in the frame memory 163 by the operation acquiring section 173 and output to the converting section 178.

The position information indicating the position of the first screen keyboard image 260 included in the input image data and the size information indicating the sizes in the longitudinal direction and the lateral direction of the first screen keyboard image 260 are input to the converting section 178 from the image processing section 162B. The position information indicating the position of the second screen keyboard image 270 superimposed on the post-processing image data and the first correspondence information and the second correspondence information are input to the converting section 178 from the image processing section 162B.

Figure 9:
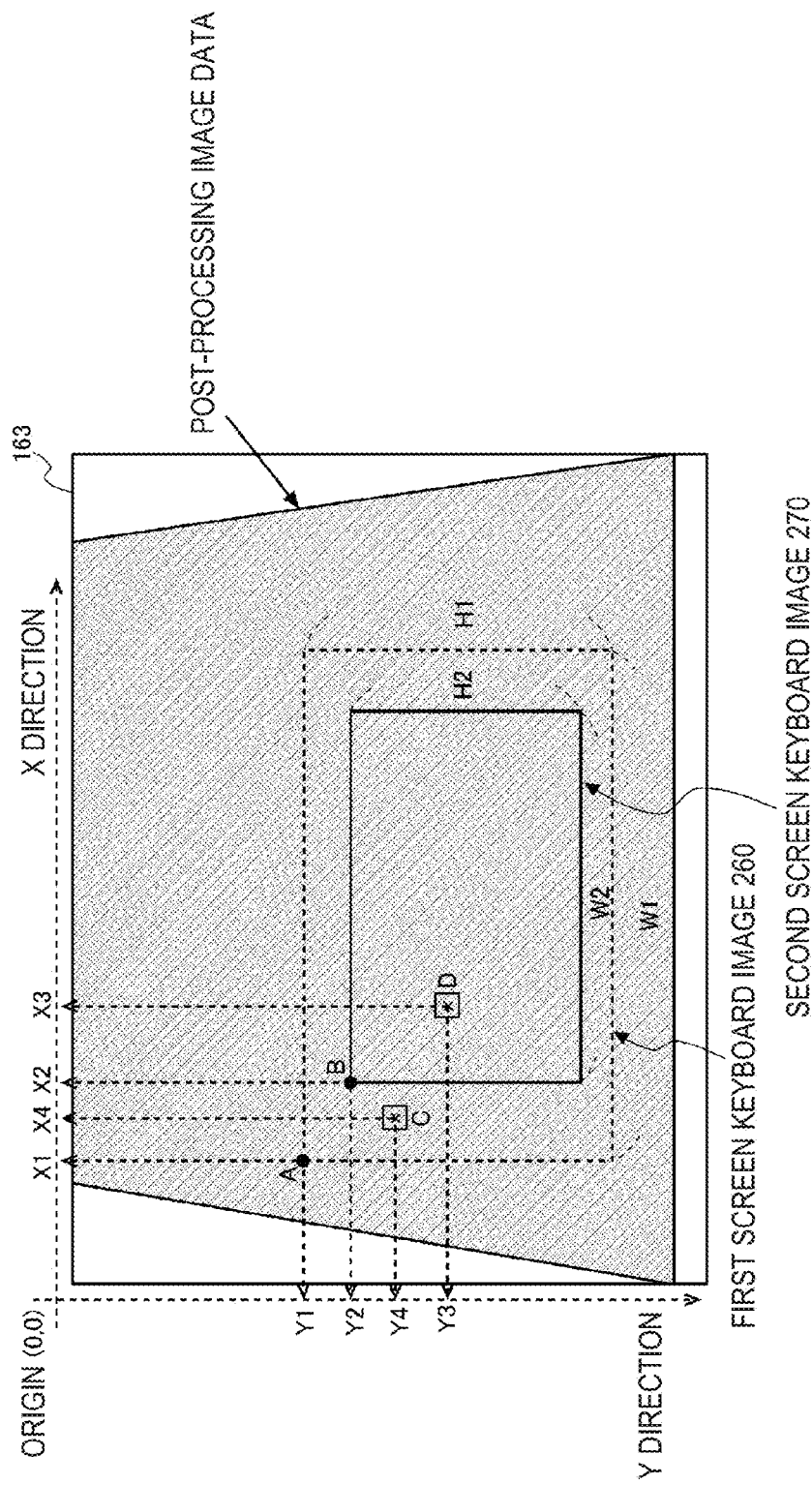
FIG. 9 is a diagram showing post-processing image data developed in a frame memory.

FIG. 9 is a diagram showing the post-processing image data developed in the frame memory 163.

In this embodiment, a coordinate in the frame memory 163 is represented in, for example, a coordinate system in which the upper left of the frame memory 163 is set as an origin, the lateral direction of the frame memory 163 is set as an X direction, and the longitudinal direction of the frame memory 163 is set as a Y direction. In FIG. 9, a shaded region indicates a storage region of the frame memory 163 in which the post-processing image data is developed.

In FIG. 9, a region where the first screen keyboard image 260 is disposed is indicated by a rectangular broken line. A region where the second screen keyboard image 270 is disposed is indicated by a rectangular solid line. Note that, to simplify the explanation, in FIG. 9, shapes of the first screen keyboard image 260 and the second screen keyboard image 270 are indicated by rectangles.

In FIG. 9, a size in the lateral direction (the X direction) of the first screen keyboard image 260 is indicated by W1 and a size in the longitudinal direction (the Y direction) of the first screen keyboard image 260 is indicated by H1. Further, in FIG. 9, a size in the lateral direction (the X direction) of the second screen keyboard image 270 is indicated by W2 and a size in the longitudinal direction (the Y direction) of the second screen keyboard image 270 is indicated by H2.

The image processing section 162B generates position information of an upper left point A of the first screen keyboard image 260 as position information of the first screen keyboard image 260. The image processing section 162B generates position information of an upper left point B of the second screen keyboard image 270 as position information of the second screen keyboard image 270. In FIG. 9, a coordinate in the frame memory 163 of the point A is indicated as A (X1, Y1) and a coordinate in the frame memory 163 of the point B is indicated as B (X2, Y2).

A coordinate indicating an operation position by the pointer 80 is input to the converting section 178. The coordinate indicating the operation position indicates a coordinate in the frame memory 163.

First, the converting section 178 specifies, on the basis of the input coordinate indicating the operation position, a key on the second screen keyboard pointed by the pointer 80. Subsequently, the converting section 178 calculates a coordinate of a representative point of the specified key. The coordinate of the representative point is a coordinate in the frame memory 163 and is, for example, a coordinate of a center position of the specified key. In FIG. 9, the coordinate of the representative coordinate is shown as a point D(X3, Y3).

Subsequently, the converting section 178 converts the specified coordinate (X3, Y3) of the point D into a coordinate on the first screen keyboard image 260. A procedure for converting the specified coordinate (X3, Y3) of the point D into a coordinate of a key corresponding to the coordinate (X3, Y3) on the first screen keyboard image 260 is explained. In FIG. 9, a coordinate on the first screen keyboard image 260 corresponding to the coordinate (X3, Y3) of the point D is indicated as a point C(X4, Y4).

First, the converting section 178 calculates absolute values of differences (X3-X2, Y3-Y2) in the X direction and the Y direction between the coordinate (X2, Y2) of the upper left point B and the coordinate (X3, Y3) of the point D of the second screen keyboard image 270.

Subsequently, the converting section 178 multiplies the calculated absolute value of the difference (X3-X2) in the X direction with a ratio of the length in the X direction of the first screen keyboard image 260 and the length in the X direction of the second screen keyboard image 270. For example, when the length in the X direction of the first screen keyboard image 260 is three times as large as the length in the X direction of the second screen keyboard image 270, the converting section 178 multiplies the absolute value of the difference (X3-X2) with "3".

Similarly, the converting section 178 multiplies the calculated absolute value of the difference (Y3-Y2) with a ratio of the length in the X direction of the first screen keyboard image 260 and the length in the X direction of the second screen keyboard image 270.

Subsequently, the converting section 178 adds the calculated absolute value of the difference to the coordinates (X2, Y2) of the upper left point A indicating the position of the first screen keyboard image 260 and calculates a coordinate on the first screen keyboard image 260.

The coordinate (X4, Y4) of the point C on the first screen keyboard image 260 is calculated by Expressions (1) and (2) described below. The ratio of the length in the X direction of the first screen keyboard image 260 and the length in the X direction of the second screen keyboard image 270 is represented as "α" and the ratio of the length in the Y direction of the first screen keyboard image 260 and the length in the Y direction of the second screen keyboard image 270 is represented as "β".

$$X4 = X1 + \alpha |X3 - X2| \quad (1)$$

$$Y4 = Y1 + \beta |Y3 - Y2| \quad (2)$$

The calculated coordinate (X4, Y4) of the C point on the first keyboard image is a coordinate in the frame memory 163. Therefore, subsequently, the converting section 178 converts the calculated coordinate (X4, Y4) of the point C into a coordinate in a frame of the input image data.

First, the converting section 178 converts, using the second correspondence information, the coordinate (X4, Y4) of the point C into a coordinate (X5, Y5) in the frame memory 163 in which the input image data before the application of the image processing by the image processing section 162B is developed. Subsequently, the converting section 178 converts, using the first correspondence information, the coordinate (X5, Y5) in the frame memory 163 into a coordinate (X6, Y6) in the frame of the input image data.

The converting section 178 outputs the converted coordinate (X6, Y6) to the PC 200B as a coordinate in the frame of the input image data.

In this processing flow, an example is explained in which the converting section 178 calculates the coordinate (X6, Y6) in the frame of the input image data and transmits the coordinate (X6, Y6) to the PC 200B. However, the converting section 178 may specify a key on the second screen keyboard and transmit information concerning the specified key to the PC 200B.

The projector 100B in the second embodiment can obtain effects explained below in addition to the effects obtained in the first embodiment explained above.

The image processing section 162B in the second embodiment detects the first screen keyboard image 260 serving as an object from the input image data input by the image input section 161. When the first screen keyboard image 260 is detected, the image processing section 162B changes the size of the first screen keyboard image 260 included in the input image data to the size determined by the size determining section 177. Therefore, the second screen keyboard image 270 having the size corresponding to the size of the projection region detected by the size detecting section 176 can be projected on the screen SC. Consequently, it is possible to suppress deterioration in operability of operation on an image of an object irrespective of a size of an image projected on the screen SC.

In the second embodiment, the control section 170B includes the converting section 178. The converting section 178 converts the operation position of the operation by the pointer 80 detected by the pointer detecting section 150 into the coordinate information indicating the coordinate in the frame of the image data. Therefore, it is possible to notify the coordinate of the operation on the input image data to the PC 200B that supplies the input image data to the projector 100B.

Third Embodiment

A third embodiment of the invention is explained.

The configuration of the projector 100 in the third embodiment is the same as the configuration of the projector 100B in the second embodiment shown in FIG. 7. Therefore, detailed explanation of the configuration is omitted. The projector 100 in the third embodiment is hereinafter referred to as projector 100C.

In this embodiment, when the screen keyboard image cannot be detected in step S14 in FIG. 8, the projector 100C displays, according to a request from a user, a screen keyboard image having a size designated by the user.

Figure 10:
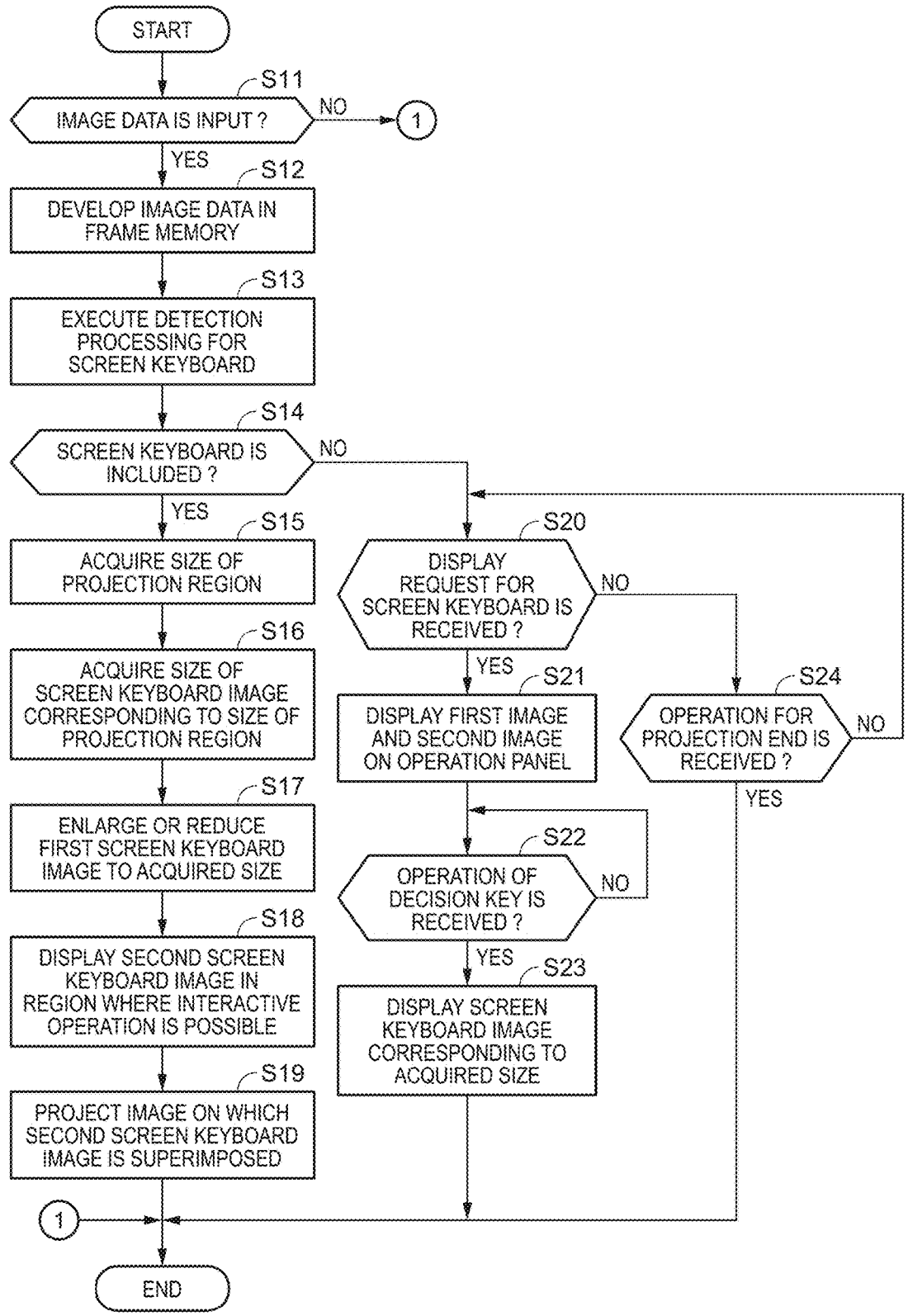
FIG. 10 is a flowchart for explaining the operation of a projector in a third embodiment.

FIG. 10 is a flowchart for explaining the operation of the projector 100C in this embodiment. Note that the operation in steps S11 to S19 is already explained with reference to the flowchart of FIG. 8. Therefore, detailed explanation of the operation is omitted.

The control section 170C determines according to a signal input from an image processing section 162C whether the first screen keyboard image 260 is included in the input image data (step S14). When determining that the first screen keyboard image 260 is not included in the input image data (NO in step S14), the control section 170C determines whether a display request for a screen keyboard is received by the operation of the operation panel 131 or the remote controller 5 (step S20).

When the display request for the screen keyboard is not received (NO in step S20), the control section 170C determines whether operation for projection end for ending the image projection on the screen SC is received (step S24). When the operation for the projection end is received (YES in step S24), the control section 170C ends the projection of the image on the screen SC and ends the processing flow. When the operation for the projection end is not received (NO in step S24), the control section 170C returns to the determination in step S20 and determines whether a display request for a screen keyboard is received.

When the display request for the screen keyboard is received in the determination in step S20 (YES in step S20), the control section 170C causes the operation panel 131 to display, for example, a rectangular image (hereinafter referred to as first image) indicating a projection region of the screen SC and a rectangular image (referred to as second image) indicating a region where a screen keyboard image is displayed in the first image (step S21). A size and a display position of the second image can be optionally changed by operation of the operation panel 131.

When the operation for changing the size and the display position of the second image is received by the operation panel 131, the control section 170C causes the operation panel 131 to display the second image, the size of which is changed by the operation, in the position changed by the operation. The control section 170C determines whether operation of a decision key is received (step S22). When the operation of the decision key is not received (NO in step S22), the control section 170C stays on standby until operation of the operation panel 131 is received. When the operation of the decision key is received (YES in step S22), the control section 170C instructs the image processing section 162C about a size and a display position of the second screen keyboard image 270 on the basis of the size of the second image with respect to the size of the first image and the position of the second image in the first image.

The image processing section 162C generates the second screen keyboard image 270 having the size conforming to the instruction of the control section 170C and superimposes the second screen keyboard image 270 in the position of the frame memory 163 conforming to the instruction of the control section 170C.

Thereafter, the image processing section 162C reads out, from the frame memory 163, the post-processing image data on which the second screen keyboard image 270 is superimposed and outputs the post-processing image data to the light-modulating-device driving section 122 as display image data. Thereafter, the light-modulating-device driving section 122 drives the liquid crystal panels of the light modulating device 112 on the basis of image signals of R, G, and B based on the display image data. The projection control section 171 controls the light-source driving section 121 and the projection-optical-system driving section 123 to project an image on the screen SC. Therefore, the screen keyboard image having the size designated by the user is projected on the screen SC (step S23).

As explained above, in the third embodiment, even when the image of the screen keyboard is not superimposed on the input image data supplied from the PC 200B or the image of the screen keyboard cannot be detected from the input image data, it is possible to superimpose the second screen keyboard image 270 based on the input image data. Therefore, it is possible to superimpose the second screen keyboard image 270 on the image projected on the screen SC.

The embodiments explained above are preferred embodiments of the invention. However, the invention is not limited to the embodiments. Various modified implementations are possible without departing from the spirit of the invention.

For example, the projector 100 may include a frame memory used by the image processing section 162A (162B or 162C) for processing and a frame memory used by the OSD processing section 165 for processing separately from each other.

In the first to third embodiments, the finger of the user is explained as an example of the pointer 80. However, for example, the pointer 80 may be an electronic pen that emits an infrared ray when the tip of the electronic pen touches the screen SC. The pointer detecting section 150 detects, from the captured image data of the imaging section 151, the infrared ray emitted by the electronic pen and detects the operation by the pointer 80.

In the first to third embodiments, the projectors 100A, 100B, and 100C are explained as the liquid crystal projector including the transmissive liquid crystal panel. However, the projectors 100A, 100B, and 100C may be a projector including a reflective liquid crystal panel and a digital mirror device.

The functional sections of the projector 100A shown in FIG. 2 and the projectors 100B and 100C shown in FIG. 7 indicate functional components realized by cooperation of hardware and software. Specific implementation forms of the functional sections are not specifically limited. Therefore, hardware individually corresponding to the functional sections does not always need to be implemented. It is also naturally possible to adopt a configuration in which one processor executes a computer program to realize functions of a plurality of functional sections. A part of the functions realized by the software in the embodiments may be realized by the hardware. Alternatively, a part of the functions realized by the hardware may be realized by the software.

What is claimed is:

1. A projector comprising:
a projecting optical system configured to project an image on a projection surface; and
a central processor configured to act as:
a size detecting section configured to detect a size of a region of the projection surface on which the image is projected by the projecting section;
a size determining section configured to determine, on the basis of the size of the region detected by the size detecting section, a size of an object projected on the projection surface; and
a projection control section configured to cause the projecting optical system to project the image including the object having the size determined by the size determining section,
wherein the size of the object is increased in proportion to a size of the region until the size of the region reaches a first fixed size set in advance, and when the size of the region is a first size larger than the first fixed size, the object having a second fixed size set in advance is projected on the projection surface, and when the size of the region is a second size larger than the first size, the object having the second fixed size is projected on the projection surface.

2. The projector according to claim 1, wherein the central processor is further configured to act as a storing section configured to store information in which the size of the region and the size of the object corresponding to the size of the region are associated, and
wherein the size determining section determines, referring to the information stored in the storing section, the size of the object corresponding to the size of the region detected by the size detecting section.

3. The projector according to claim 2, wherein, when the storing section does not store the size of the object corresponding to the size of the region detected by the size detecting section, the size determining section calculates the size of the object according to proportional calculation using the information stored by the storing section.

4. The projector according to claim 1, wherein the central processor is further configured to act as:
an image input section configured to input image data projected by the projecting section as the image;
an object detecting section configured to detect an image of the object from the image data input by the image input section; and
a processing section configured to change, when the image of the object is detected by the object detecting section, a size of the image of the object included in the image data to the size determined by the size determining section.

5. The projector according to claim 4, wherein the central processor is further configured to act as:
an operation detecting section configured to detect operation performed by a pointer on the image of the object projected on the projection surface; and
a coordinate converting section configured to convert, on the basis of a position and a size of the image of the object in the image data input by the image input section and a position and a size of the image of the object in the image data processed by the processing section, a coordinate of the operation detected by the operation detecting section into a coordinate in the image data input by the image input section.

6. The projector according to claim 1, wherein the projection control section causes the projecting optical system to project an image of a keyboard as an image of the object.

* * * * *